Patented Apr. 3, 1923.

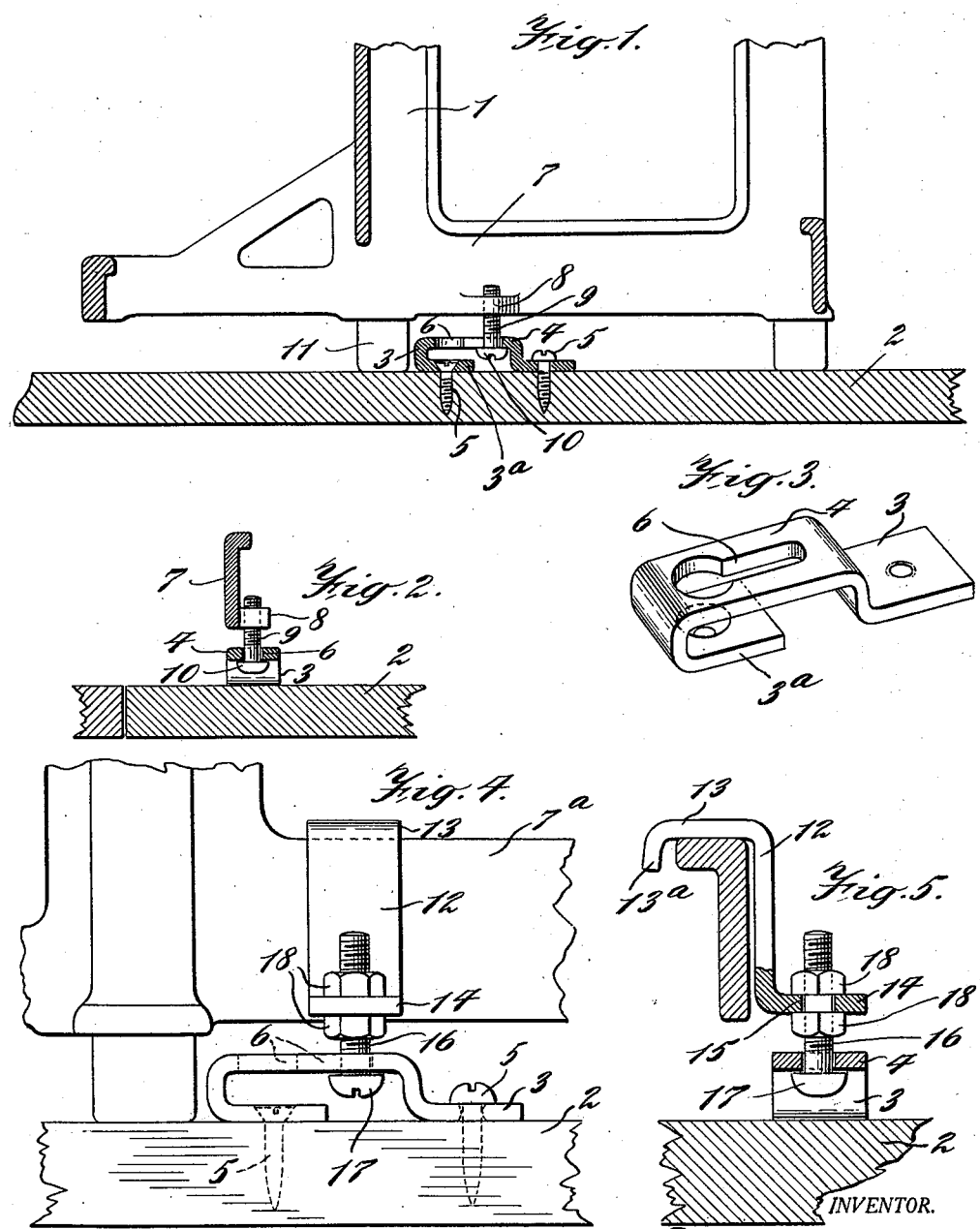

1,450,183

UNITED STATES PATENT OFFICE.

ELMER CLYDE MOON, OF SHEEPSHEAD BAY, NEW YORK.

TYPEWRITER CLAMP.

Application filed October 26, 1921. Serial No. 510,610.

*To all whom it may concern:*

Be it known that I, ELMER CLYDE MOON, a citizen of the United States, residing at Sheepshead Bay, in the county of Kings and State of New York, have invented certain new and useful Improvements in Typewriter Clamps, of which the following is a full, clear, and exact description.

This invention relates to improvements in typewriter clamps or securing devices by which a typewriting machine may be releasably attached to its support, such as to a table or desk top or base board.

An object of the invention is to provide an improved clamp or device for this purpose which will securely fasten a typewriting machine to its support, which permits of the attachment of the machine to its support or its detachment therefrom in a simple and rapid manner, and which is simple and inexpensive in construction, applicable to existing machines without changes in their construction, and attractive in appearance. Other objects and advantages will be apparent from the following description and the novel features of the invention will be particularly pointed out in claims.

In the accompanying drawing, Fig. 1 is a sectional elevation of a portion of a support and a typewriter frame with one embodiment of my improved securing device applied thereto.

Fig. 2 is a transverse section of the same.

Fig. 3 is a perspective of one of the parts of the securing device.

Fig. 4 is a side elevation of a portion of a typewriting machine and support with a slightly modified embodiment of my securing device applied thereto, and Fig. 5 is a transverse section of the same.

In the embodiment illustrated in Figs. 1 and 2, a typewriter 1 is disposed upon the surface of a support 2 and is to be secured thereto. Upon the upper surface of the support 2 I secure an attaching member 3 having a raised section 4 intermediate of its ends which is spaced from the upper surface of the support when the member is attached thereto in any suitable manner such as by screws 5 passing through apertures in the ends of the member. The spaced section 4 of the attaching member is provided with a keyhole-shaped slot 6 running lengthwise of the member. The lower side cross bars 7 of many typewriter frames are provided with lugs or ears 8 extending horizontally and inwardly therefrom, each lug having therein a threaded aperture for receiving the threaded end of a bolt passing through the support from the under face thereof. Into the threaded apertures of these lugs 8 I thread a short bolt 9 with the head depending therefrom.

When the typewriter is to be attached to the support, it is placed over the attaching members 3, the heads 10 of the bolts 9 are introduced, head first, into the larger ends of the keyhole apertures, and then the typewriter frame is shifted rearwardly to carry the shanks of the bolts 9 into the narrow sections of the apertures 6. The engagement of the heads 10 of the bolts with the under faces of the spaced portions 4 of the attaching members 3 prevents a direct upward movement of the typewriter, and the narrow end of the slot prevents further rearward movement of the typewriter when the support 2 is shifted rearwardly into an inclined position, such as is customary with several types of desks. The apertures being closed at both ends will prevent movement of the typewriter in a forward direction, such as would carry the bolts out of alignment with the slots, or disengage them therefrom, and consequently there is no danger that the typewriter will be shifted forwardly accidentally and left out of alignment with the narrow portion of the slot. The forward end 3ª of the attaching member is preferably doubled back beneath the spaced section 4 so as to occupy a space as short as possible and clear the feet 11 of the typewriter frame. The aperture in the doubled back end of the attaching member is disposed beneath and in alignment with the larger end of the keyhole slot so that the screw and a screw driver may be passed through the slot in the attachment of the member to the support.

In the embodiment illustrated in Figs. 4 and 5 I have shown the application of the invention to typewriters which do not have the horizontally extending lugs upon the lower side cross arms of the frame. For these machines the anchoring element includes a hook bar 12 having a hook end 13 of a size and shape to embrace the upper edge of a lower side cross beam 7ª of the typewriter frame. A nose 13ª of the hook end 13 prevents displacement of the hook laterally out of engagement with the cross bar. The lower end 14 of the hook bar is extended horizontally and has an aperture 15. A short anchoring bolt 16, similar to bolt 9, passes through the aperture with the head 17 at the lower end, and is adjustably held herein by nuts 18 threaded upon the shank of the bolt and disposed upon opposite faces of the end 14 of the hook bar. The bolt 16 engages with the attaching member 3 in the same manner as explained for the embodiment illustrated in Figs. 1 and 2.

In the use of the device, the bolts 9 are first attached to the lugs 8, if the machine is of the type shown in Figs. 1 and 2, or the hook bar is applied if the machine is of the type shown in Figs. 4 and 5. The attaching members 3 are secured to the support at the sides of the machine, directly beneath the bolts. To attach the machine to the support the machine is placed so as to pass the bolts 9 or 16 head first through the larger ends of the keyhole apertures of the attaching members and then the entire machine is shifted rearwardly to carry the shanks of the bolts into the narrow sections of the apertures with the heads beneath the spaced sections 4 so as to firmly secure the typewriter to the support. The bolts prior to their engagement with the slots 6 may be adjusted vertically so that when they are inserted into the apertures and pushed rearwardly the heads will fit closely against the under faces of the spaced sections 4. To remove the typewriter from its support it is merely necessary to pull the machine forwardly a short distance so as to carry the shanks of the bolts into the larger sections of the apertures 6, after which the machine may be lifted directly up and away from the supporting surface. It will thus be seen that with a device constructed in accordance with this invention the use of keys is eliminated, the machine can be quickly and easily secured to or detached from its support by simple movements, and the attaching devices are very simple and inexpensive and applicable to all makes of machines without changes in their construction.

It will be obvious that various changes in the details herein shown and described may be made by those skilled in the art within the principle and scope of the invention.

I claim:

1. A device for securing a typewriting machine to a support, comprising a member attachable to the upper surface of the support and having a portion spaced from said surface, said spaced portion having therein a keyhole-shaped aperture, and an element attachable to the machine to depend therefrom and having at its lower end a shank portion terminating in a head, whereby when the head is passed through the larger portion of the aperture the shank portion may be passed into the restricted end thereof to lock the machine to the support by the engagement of the head with the under face of the spaced portion.

2. A device for securing a typewriting machine to a support, comprising a member attachable to the upper surface of the support and having a portion spaced from said surface, said spaced portion having therein a keyhole-shaped aperture, and an element attachable to the machine to depend therefrom and having at its lower end a shank portion terminating in a head, whereby when the head is passed through the larger portion of the aperture the shank portion may be passed into the restricted end thereof to lock the machine to the support by the engagement of the head with the under face of the spaced portion, said shank and head being adjustable vertically to permit of the positioning of the head closely beneath the spaced portion.

3. A device for securing a typewriting machine to a support, comprising a member attachable to the upper surface of the support and having a portion spaced from said surface, said spaced portion having therein a keyhole shaped aperture, a hook bar adapted to hook over a side frame bar of the machine, and a headed bolt threaded into the under face of the lower end of the bar, whereby when the bolt is passed head first through the larger end of the aperture, the shifting of the hook bar parallel with the surface of the support will carry the shank of the bolt into the narrow end of the aperture to lock the typewriter to the support.

In witness whereof, I hereunto subscribe my signature.

ELMER CLYDE MOON.